(12) United States Patent
Eger et al.

(10) Patent No.: US 10,482,548 B2
(45) Date of Patent: Nov. 19, 2019

(54) METHOD AND APPARATUS FOR PERFORMING ENERGY MANAGEMENT IN A POWER SUPPLY GRID

(71) Applicant: Caterva GmbH, Pullach (DE)

(72) Inventors: Kolja Eger, Wedemark (DE); Roland Gersch, Munich (DE); Joerg Heuer, Oberhaching (DE); Martin Winter, Rosenheim (DE)

(73) Assignee: ALELION ENERGY SYSTEM AB, Goeteborg (SE)

( * ) Notice: Subject to any disclaimer, the term of this patent is extended or adjusted under 35 U.S.C. 154(b) by 359 days.

(21) Appl. No.: 14/426,056

(22) PCT Filed: Apr. 3, 2013

(86) PCT No.: PCT/EP2013/057015
§ 371 (c)(1),
(2) Date: Mar. 4, 2015

(87) PCT Pub. No.: WO2014/040760
PCT Pub. Date: Mar. 20, 2014

(65) Prior Publication Data
US 2015/0254787 A1 Sep. 10, 2015

(30) Foreign Application Priority Data

Sep. 14, 2012 (EP) ..................... 12184455

(51) Int. Cl.
*G06Q 50/06* (2012.01)
*H02J 3/06* (2006.01)
*G05B 15/02* (2006.01)
*H02J 13/00* (2006.01)

(52) U.S. Cl.
CPC ............ *G06Q 50/06* (2013.01); *G05B 15/02* (2013.01); *H02J 3/06* (2013.01); *H02J 13/0006* (2013.01); *Y04S 20/40* (2013.01)

(58) Field of Classification Search
CPC . G06Q 50/06; G05B 15/02; H02J 3/06; H02J 13/0006; Y04S 10/54; Y04S 20/40
See application file for complete search history.

(56) References Cited

U.S. PATENT DOCUMENTS

2008/0052145 A1* 2/2008 Kaplan .............. G06Q 10/0631
705/7.12
2012/0146799 A1* 6/2012 Bell ........................ H04Q 9/00
340/635

* cited by examiner

*Primary Examiner* — Brian W Wathen
*Assistant Examiner* — Hung H Dang
(74) *Attorney, Agent, or Firm* — Westman, Champlin & Koehler, P.A.

(57) ABSTRACT

An energy management system of a power supply grid includes at least one control unit (CU) connected to distributed energy resource controllers (ERC) of energy resources (ER) of the power supply grid by means of a communication network, (CNW) wherein the control unit (CU) monitors communication links (CL) between the control unit (CU) and the energy resource controllers (ERC) via the communication network (CNW), and wherein the control unit (CU) is adapted to calculate a predicted operation behavior of an energy resource (ER) controlled by an energy resource controller (ERC) if a loss of communication or a communication bandwidth limitation of the monitored communication link to the energy resource controller (ERC) is detected.

22 Claims, 2 Drawing Sheets

METHOD AND APPARATUS FOR PERFORMING ENERGY MANAGEMENT IN A POWER SUPPLY GRID

This is a U.S. national phase application, which is based on, and claims priority from, PCT application Ser. No. PCT/EP2013/057015, filed Apr. 3, 2013, which claims priority from foreign application Ser. No. 12184455.9, filed Sep. 14, 2012, in EP.

FIELD OF THE INVENTION

The invention relates to a method and apparatus for performing energy management in a power supply grid comprising distributed energy resources being controlled by energy resource controllers which are connected to at least one control unit by means of a communication network.

TECHNICAL BACKGROUND

A power supply grid can comprise power supply networks with different voltage levels such as a high-voltage transmission grid and lower voltage distribution grids to which a plurality of energy resources can be connected. These energy resources include, among other types, power supply consumers or loads which consume electrical power. The loads can for instance be formed by electrical machines or devices in factories or private households. The power consumed by the loads is generated by a second type of energy resource, namely power sources or power generation units which can be connected to the high-voltage transmission grid and/or to the lower voltage distribution grid. Conventional power generation units comprise power plants such as coal power plants or nuclear power plants connected to the high-voltage transmission grid. In power supply grids, there is a trend that more renewable power sources are employed to generate electrical power. These renewable power sources or power generation units comprise for instance wind farms with a plurality of wind generators as well as photovoltaic generation units installed on roofs or solar power farms with a plurality of photovoltaic entities generating electrical power from sunlight. These renewable power sources forming energy resources of the power supply grid are distributed and volatile and significant numbers are connected to the lower voltage distribution grid of the power supply grid. With the increasing portion of electrical power generated by renewable power sources, it becomes more difficult to guarantee a stability of the power supply grid and to provide always sufficient capacities. As a consequence, distributed energy storage devices are used and connected to the power supply grid. Accordingly, a power supply grid comprises as energy resources electrical loads or consumers consuming electrical power and drawing electrical power from the power supply grid as well as power sources which are adapted to feed electrical power into the power grid and a third type, namely electrical energy storage devices which are adapted to store electrical power. The cost of a storage device increases with the maximum storage capacity of the device. Accordingly, storage devices must be employed in order to use their storage capacity efficiently. Distributed electrical storage devices can be used efficiently by combining multiple usages comprising local energy buffering, local blackout prevention of a blackout of the power supply grid as well as efficient support of the power supply grid, in particular with respect to grid stability and capacity. The fourth type of energy resource is formed by any combination of the first three types.

An energy resource such as an energy storage device is controlled by an energy resource controller. This energy resource controller is connected via a communication infrastructure or communication network to a distributed or central control unit. This communication infrastructure can be a public communication infrastructure such as a public communication network. Since the communication link between the energy resource controller and the control unit via a communication network can be unreliable, there can be times when no or only limited communication between the energy resource controller and the control unit via the communication link is possible. If the communication link between the control unit and the energy resource controller of the energy resource is lost or the bandwidth of the communication link is strongly limited, a control of the distributed energy resource by the remote control unit is no longer possible.

In a conventional energy management system an affected energy resource whose energy resource controller has lost its communication link to the control unit cannot make any further contribution to the power supply grid. Further, during times where a communication is established but a bandwidth of the communication link is low due to other services on the same communication link, the energy resource cannot be any longer controlled to make a contribution to the power supply grid.

Accordingly, there is a need to provide an apparatus and a method for performing an energy management in a power supply grid which allows that an affected energy resource whose communication link has been lost or limited can still make a contribution to the operation of the power supply grid, preferably in combination with other usages.

SUMMARY OF THE INVENTION

According to a first aspect of the present invention, an energy management system of a power supply grid is provided comprising
at least one control unit connected to distributed energy resource controllers of energy resources of said power supply grid by means of a communication network, wherein said control unit monitors communication links between said control unit and the energy resource controllers via said communication network, wherein said control unit is adapted to calculate a predicted operation behavior of at least one energy resource controlled by an energy resource controller if a loss of communication or a communication bandwidth limitation of the monitored communication link to the respective energy resource controller is detected.

In a possible embodiment of the energy management system according to the first aspect of the present invention, the control unit is adapted to control energy resource controllers of other energy resources of said power supply grid to which a communication link via said communication network still exists depending on the calculated predicted behavior of the affected energy resource whose energy resource controller has lost its communication link to said control unit or where the communication bandwidth of the communication link is limited.

In a still further possible embodiment of the energy management system according to the first aspect of the present invention, the control unit is adapted to calculate energy management policies and to distribute them to energy resource controllers of said energy management system such that after a loss or a limitation of communication between said control unit and at least one affected energy resource controller has been detected, the distributed energy management policies executed by the remaining energy resource controllers ensure that the remaining energy resources can collectively provide sufficient power for power supply grid services.

In a still further possible embodiment of the energy management system according to the first aspect of the present invention, after a loss or a limitation of communication between said control unit and at least one affected energy resource controller has been detected, a local optimization of individual energy resources controlled by the energy resource controllers is performed on the basis of the energy management policies calculated and distributed by the control unit of said energy management system to said energy resource controllers before the loss or limitation of communication has occurred.

In a still further possible embodiment of the energy management system according to the first aspect of the present invention, after a loss or limitation of communication between said control unit and at least one affected energy resource controller has been detected, a global optimization taking into account all energy resources controlled by the energy resource controllers is performed by the affected energy resource controllers and by the control unit on the basis of the energy management policies calculated and distributed by the control unit of said energy management system to said energy resource controllers before the loss or limitation of communication has occurred.

In a still further possible embodiment of the energy management system according to the first aspect of the present invention, the energy management policies calculated by at least one processor of said control unit are calculated depending on a probability of loss or limitation of the monitored communication links between said control unit and the distributed energy resource controllers of said energy management system and/or depending on predicted local energy states of the energy resources controlled by the distributed energy resource controllers after the loss or limitation of communication of at least one monitored communication link has been detected.

In a still further possible embodiment of the energy management system according to the first aspect of the present invention, the predicted local energy states of the energy resources controlled by the distributed energy resource controllers are predicted on the basis of available global information including time information data and/or grid frequency and/or on the basis of available local information including weather information and/or on the basis of historic behavior data about the operation behavior of the energy resources in the past before the loss or limitation of communication of at least one monitored communication link has been detected.

In a still further possible embodiment of the energy management system according to the first aspect of the present invention, information which is relevant for the prediction of the local energy state of an energy resource after a loss or limitation of communication has occurred and which cannot be determined on the basis of available global information is substituted for purposes of the prediction by a worst-case assumption. The worst-case assumption can be determined either based on installation-dependent limits of the energy resource or by a rule within an energy management policy distributed to the affected energy resource controller before the loss of communication has occurred.

In a still further possible embodiment of the energy management system according to the first aspect of the present invention, the installation-dependent limits of the energy resource comprise at least one of the following limits: the maximum power output of the energy resource, the maximum power input of the energy resource, the maximum usable energy content of the energy resource, the maximum power flow of the local connection to the power supply grid, the maximum power that can be generated by a local generator and/or the maximum power that can be consumed by one or more local power consumers.

In a still further possible embodiment of the energy management system according to the first aspect of the present invention, the control unit is a central control center.

In a still further alternative embodiment of the energy management system according to the first aspect of the present invention, the control unit is formed by distributed peer to peer control entities.

In a possible embodiment of the energy management system according to the first aspect of the present invention, the control unit is adapted to calculate the predicted operation behavior of the affected energy resource on the basis of the active set of energy management policies transmitted by said central or distributed control unit via the communication link to the energy resource controller of the affected energy resource before a loss or limitation of communication of said communication link is detected.

In a still further possible embodiment of the energy management system according to the first aspect of the present invention, the set of energy management policies comprises at least one energy management policy having rules used by a policy management unit connected to the energy resource controller to perform a local control of the associated energy resource.

In a still further possible embodiment of the energy management system according to the first aspect of the present invention, measurements of local parameters by the energy resource controller are transmitted to the control unit before any loss or limitation of the communication link occurs.

In a further possible embodiment of the energy management system according to the first aspect of the present invention, the measurements of local parameters by the energy resource controller comprise at least one measured value or time series of at least one of the following variables comprising state of charge, state of supply, internal resistance, locally generated power, locally consumed power, phase shift between voltage and current, temperature at at least one position in the energy resource and/or the environment.

In a still further possible embodiment of the energy management system according to the first aspect of the present invention, information which is relevant for the prediction of the local energy state of an energy resource after a loss or limitation of communication has occurred and which cannot be determined on the basis of available global information is substituted for purposes of the prediction by a most-probable case assumption. The most-probable case assumption can be determined either based on measurements of local parameters transmitted to the control unit before a loss or limitation of communication has occurred or by a rule within an energy management policy distributed to the affected energy resource controller before the loss of communication has occurred.

In a further possible embodiment of the energy management system according to the first aspect of the present invention, after a loss or a limitation of communication of the communication link to said control unit has occurred said policy management unit of the energy resource controller is adapted to emulate a continued reception of control parameters from said control unit on the basis of the active set of energy management policies and to perform a continued local control of the associated energy resource controlled by said energy resource controller using the control parameters within control limits indicated by the set of energy management policies.

In a still further possible embodiment of the energy management system according to the first aspect of the present invention, the rules of said energy management policies used by the policy management unit of the energy resource controller indicate a reaction of the policy management unit in response to measurements of local parameters of said power supply grid distributing power to the energy resource or receiving power from the energy resource being controlled by said energy resource controller.

In a further possible embodiment of the energy management system according to the first aspect of the present invention, the local parameters comprise at least one measured value or time series of at least one of the following variables comprising voltage frequency, voltage level, spectra of voltages, current, phase shift between voltage and current, state of charge, state of supply.

In a still further possible embodiment of the energy management system according to the first aspect of the present invention, the measurements are performed by means of sensors located at the energy resource and/or at other energy resources of the same type located in the vicinity of the affected energy resource when a loss or limitation of communication of the communication link between the energy controller of the affected energy resource and the control unit has occurred.

In a still further possible embodiment of the energy management system according to the first aspect of the present invention, the measurements comprise context data including weather condition data indicating a current and/or forecast weather condition at the location of the energy resource, time data indicating a local time, date, day of week, and/or month at the location of the energy resource, and location data indicating a current geographical location of the energy resource.

In a still further possible embodiment of the energy management system according to the first aspect of the present invention, the energy resource is immobile and located at a fixed location and connected permanently to the power supply grid.

In a still further possible alternative embodiment of the energy management system according to the first aspect of the present invention, the energy resource is a mobile resource and moveable between different locations and connectable to the power supply grid.

In a still further possible embodiment of the energy management system according to the first aspect of the present invention, the energy resource is adapted to feed electrical power into said power supply grid.

In a still further possible embodiment of the energy management system according to the first aspect of the present invention, said energy resource is adapted to draw electrical power from said power supply grid.

In a still further possible embodiment of the energy management system according to the first aspect of the present invention, said energy resource is adapted to store energy and to either consume power from or feed power to the power supply grid.

In a still further possible embodiment of the energy management system according to the first aspect of the present invention, the measurements comprise reliability data indicating a reliability of the communication link between the energy resource controller and the control unit and/or a reliability of the associated energy resource.

In a still further possible embodiment of the energy management system according to the first aspect of the present invention, the set of energy management policies comprises a first energy management policy having rules used by the policy management unit of the energy resource controller during a predetermined time period directly after a loss or limitation of the communication has occurred and a second energy management policy having rules used by the policy management unit of the energy resource controller after the predetermined time period has expired.

In a still further possible embodiment of the energy management system according to the first aspect of the present invention, the communication link comprises a wired or wireless link via a communication network.

In a still further possible embodiment of the energy management system according to the first aspect of the present invention, said communication link comprises a communication link via the power supply grid.

In a still further possible embodiment of the energy management system according to the first aspect of the present invention, the control unit is adapted to detect a loss or limitation of communication of a monitored communication link to an energy resource controller of an energy resource by monitoring keep alive signals or keep alive messages transmitted by the energy resource controller to the control unit via said communication link and/or responses from the energy resource controller to keep alive signals or keep alive messages transmitted by the control unit.

The invention further provides according to a second aspect a method for performing an energy management in a power supply grid comprising distributed energy resources having energy resource controllers connected to at least one control unit by means of a communication network comprising the steps of: monitoring the communication links between said at least one communication unit and the energy resource controllers via said communication network; and calculating a predicted operation behavior of an energy resource if a loss or limitation of communication of the communication link between the energy resource controller of the affected energy resource and the communication unit is detected.

In a possible embodiment of the method according to the second aspect of the present invention, the communication unit controls the energy resource controllers of other remaining energy resources to each of which a communication link via said communication network still exists depending on a calculated predicted operation behavior of the affected energy resource whose energy resource controller has at least partially lost its communication link to said communication unit.

The invention further provides according to a third aspect a control unit of an energy management system of a power supply grid wherein said control unit is adapted to monitor communication links between said control unit and distributed energy resource controllers via said communication network, wherein said control unit is further adapted to calculate a predicted operation behavior of an energy resource controlled by an energy resource controller if a loss of communication or a communication bandwidth limitation of the monitored communication link to said energy resource controller is detected.

BRIEF DESCRIPTION OF THE DRAWINGS

In the following, possible embodiments and implementations of a method and apparatus of the present invention are described in relation to the enclosed figures.

DETAILED DESCRIPTION OF EMBODIMENTS

Figure 1:
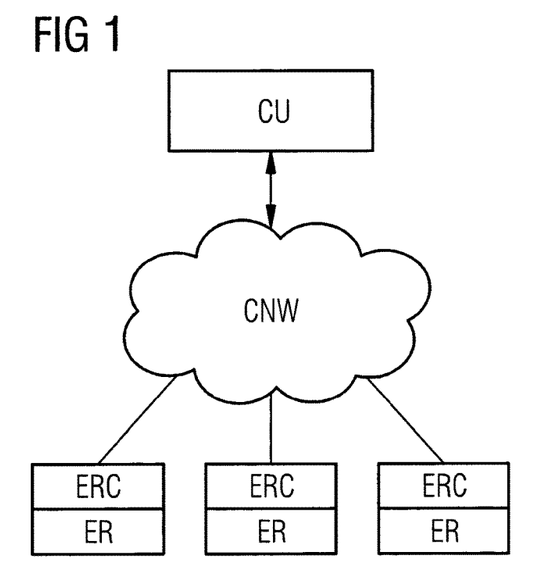
FIG. 1 shows a diagram for illustrating a possible architecture of an energy management system according to the first aspect of the present invention.
Figure 2:
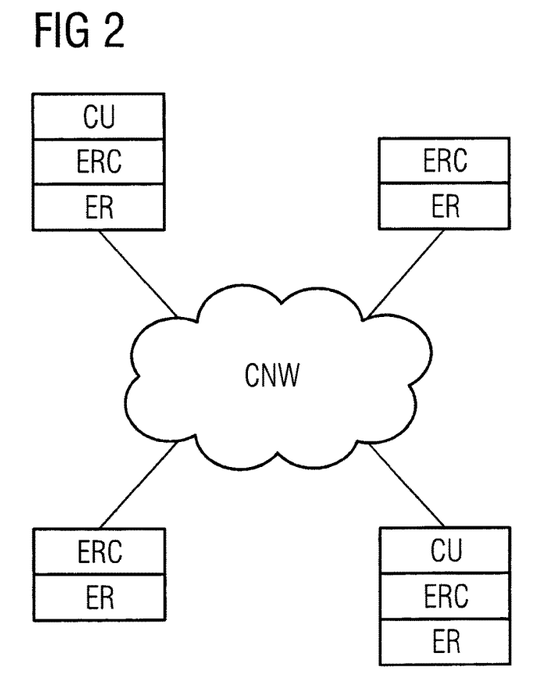
FIG. 2 shows a diagram for illustrating an alternative architecture of an energy management system according to the first aspect of the present invention.

According to a first aspect of the present invention, an energy management system of a power supply grid PSG is provided wherein said power supply grid is connected to a plurality of energy resources ER wherein each energy resource is controlled by an energy resource controller ERC as illustrated in FIGS. 1 and 2. FIGS. 1 and 2 show possible architectures of an energy management system according to the first aspect of the present invention wherein energy resource controllers ERC of energy resources ER are connected to a communication network CNW. This communication network CNW can be a public communication network such as a telephone network or a data network, in particular the internet. The energy management system according to the first aspect of the present invention comprises at least one control unit CU connected to the distributed energy resource controllers ERC of the energy resources ER within said power supply grid PSG by means of the communication network CNW.

FIG. 1 shows an architecture where a central control unit CU is provided communicating with the energy resource controllers ERC of the different energy resources ER via said communication network CNW.

FIG. 2 shows an alternative architecture of the energy management system wherein the communication unit CU is formed by distributed peer to peer communication unit entities which communicate with each other via a peer to peer mechanism. As shown in FIG. 2, a control unit entity of the distributed control unit CU can be provided at or close to the location of an energy resource controller ERC.

A central control unit CU as illustrated in FIG. 1 or the distributed control entities of the control unit CU as illustrated in FIG. 2 are adapted to monitor communication links CL between the control unit CU and the energy resource controllers ERC via the communication network CNW. The central or distributed control unit CU is adapted to calculate a predicted operation behavior of an energy resource ER controlled by an energy resource controller ERC if a loss of communication or a communication bandwidth limitation of the monitored communication link to said energy resource controller ERC is detected.

In a possible embodiment, the control unit CU is adapted to detect a loss or limitation of communication of a monitored communication link to an energy resource controller ERC of an energy resource by monitoring keep alive signals or keep alive messages transmitted by the energy resource controller ERC to the control unit CU via the communication link CL. As soon as the communication link CL is broken or severely limited or damaged, no or less keep alive messages or signals are received by the control unit or there is an increase in latency. The control unit CU does react to the loss or limitation of the communication link CL to the respective energy resource controller ERC of the affected energy resource ER.

A central control unit CU can be formed by a data processing device which is capable to transmit configuration data to the energy resources ER and their energy resource controllers ERC. The transmission of the configuration data or policy can take place in a possible embodiment in a configuration phase of the energy management system. In an alternative embodiment, the transmission of the configuration data or policy can also take place during the operation of the power supply grid PSG and its energy management system.

In a possible embodiment as illustrated in FIG. 2, a peer to peer mechanism is used to provide decision-taking capabilities in a reliable manner. For instance, based on a loss of communication with an energy resource controller ERC of an energy resource ER the available distributed control units CU can negotiate a new policy for one or more particular available energy resources ER connected to the power supply grid PSG.

Figure 3:
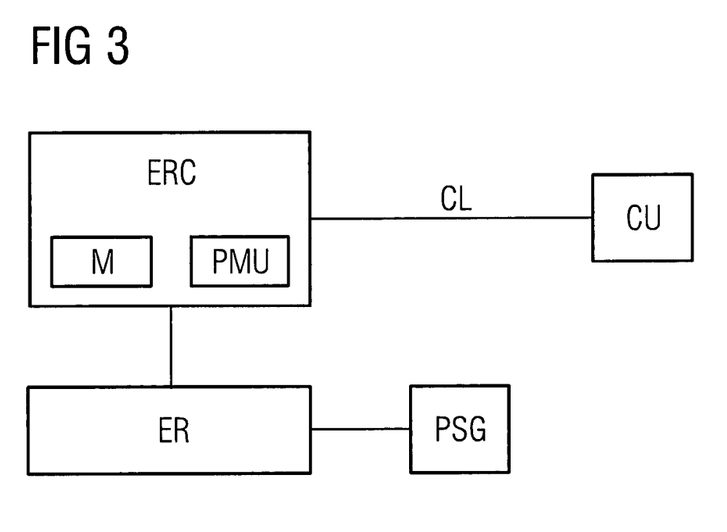
FIG. 3 shows a block diagram for illustrating the operation of an apparatus and a method for performing an energy management in a power supply grid according to a possible embodiment of the present invention.

FIG. 3 shows a block diagram for illustrating the operation of an energy management system according to the first aspect of the present invention. As illustrated in FIG. 3, a control unit CU is connected via the communication network by means of a communication link CL to an energy resource controller ERC of an energy resource ER. The energy resource ER is directly or indirectly connected to the power supply grid PSG. The energy resource ER can be formed by a power generation unit PGU which is adapted to feed electrical power into said power supply grid PSG. This energy resource ER can comprise one or several synchronous power generators. Further, the energy resource ER can also be formed by a consuming entity which draws electrical power from the power supply grid PSG. For instance, the energy resource ER can be formed by one or several electrical machines driven by electrical power received from the power supply grid PSG. Energy resources ER can be further formed by an energy storage device storing electrical or other forms of energy such as batteries or accumulators. An energy resource can be an immobile fixed energy resource which is located at a fixed location and connected permanently to the power supply grid PSG. It is also possible that at least some of the energy resources ER are mobile and movable between different locations and connectable to the power supply grid PSG temporarily. For instance, an energy resource ER can comprise storage devices which are movable as vehicles to different locations of the power supply grid PSG.

One or several energy resources ER at a site can be controlled by an energy resource controller ERC as illustrated in FIG. 3. The energy resource controller ERC is linked in a normal operation of the energy management system via a communication link CL to the remote control unit CU as shown in FIG. 3. With the energy management system of the power supply grid according to the first aspect of the present invention, the control unit CU monitors the communication links CLs between the control unit CU and the energy resource controllers ERC via the communication network. The control unit CU is adapted to calculate a predicted operation behavior of an energy resource ER controlled by an energy resource controller ERC if a loss of communication or a communication bandwidth limitation of the monitored communication link CL to said energy resource controller is detected. The control unit CU is further adapted to control energy resource controllers ERC of other energy resources ER of said power supply grid PSG to which a communication link CL via said communication network CNW still exists depending on the calculated predicted behavior of the affected energy resource whose energy resource controller ERC has lost its communication link CL to the control unit CU or where the communication bandwidth of the communication link CL is reduced or limited.

The control unit CU is further adapted to calculate energy management policies EMP and to distribute the energy management policies EMP to the energy resource controllers ERC of said energy management system. The distribution of the energy management policies EMP can take place in a configuration phase of the energy management system or also during the normal operation of the energy management system, for instance by distributing the energy management policies EMP periodically, e.g. every minute, every hour or every day. After a loss or limitation of communication between the control unit CU and at least one affected energy resource controller ERC has been detected, the already distributed energy management policies EMP are executed by the energy resource controllers ERC and collectively provide sufficient power for different power supply grid services.

If a loss or limitation of communication between said control unit CU and at least one affected energy resource controller ERC has been detected, further, a local optimization of individual energy resources ER controlled by the energy resource controllers ERC is performed. This local optimization is performed in a possible implementation on the basis of the energy management policies EMP calculated and distributed by the control unit CU of said energy management system to said energy resource controllers ERC before the loss or limitation of communication has occurred and was detected. In addition, installation-dependent limits of the energy resource ER as well as current and historical local measurements can be the basis of the optimization.

In a further possible embodiment, after a loss or limitation of communication not only a local optimization of the individual energy resources ER takes place but also a global optimization of the total energy resources is performed. In this embodiment, after a loss or limitation of communication between said control unit CU and at least one affected energy resource controller ERC has been detected, the global optimization of the total energy resources controlled by the energy resource controllers is performed on the basis of the energy management policies EMP calculated and distributed by the control unit CU of said energy management system to the energy resource controllers ERC before the loss or limitation of communication has occurred and detected. The optimization minimizes a predicted cost function which in general comprises at least one of the following consequences of the usage predicted under the energy management policies to be optimized: the lifetime reduction of the energy resources, the electrical power which needs to be generated by the energy resource, the electrical power which needs to be consumed by the energy resource, the heat which is generated by the energy resources. The optimization can also take into account one or more of the following boundary conditions: a measure of power generation or power consumption provided by the sum of all energy resources for a grid service, a measure of reactive power generation or compensation provided by the sum of all energy resources for a grid service, a maximum temperature for each energy resource.

The control unit CU as shown in FIG. 3 calculates or generates energy management policies EMP, which are distributed to all or at least a considerable portion of the energy resource controllers ERC within the energy management system via the communication link CL of the communication network. The received energy management policies EMP can be stored in a local memory M of the energy resource controller ERC as shown in FIG. 3. In a possible embodiment, the energy resource controller ERC can also comprise a policy management unit PMU as shown in FIG. 3. The control unit CU which can be a central control center or formed by distributed peer to peer control entities is adapted to calculate a predicted operation behavior of the at least one affected energy resource ER on the basis of the active set of energy management policies EMP transmitted by this control unit CU via the communication link to the energy resource controller ERC of the affected energy resource before a loss or limitation of communication of the communication link CL has been detected. This set of energy management policies comprises at least one energy management policy EMP having rules R used by the policy management unit PMU connected to the energy resource controller ERC to perform a local control of the associated energy resource controller ERC, which in turn performs a local control of the energy resource ER. After a loss or limitation of communication of the communication link CL to the control unit CU has occurred, the policy management unit PMU of the energy resource controller ERC is adapted to emulate a continued reception of control parameters CP from said control unit CU on the basis of the active set of energy management policies EMP and to perform a continued local control of the associated energy resource ER controlled by said energy resource controller ERC using the control parameters CP and control limits indicated by or derived according to the rules specified by the active set of energy management policies EMP. In a possible embodiment, the received set of energy management policies EMP is stored automatically in the local memory M of the energy resource controller ERC and can be accessed by the policy management unit PMU. The stored rules R of said energy management policies EMP used by the policy management unit PMU of the energy resource controller ERC indicate a reaction of the policy management unit PMU in response to measurements m of (a) local parameters of said power supply grid PSG which distributes power to the energy resources ER or which receives power from the energy resources ER controlled by said energy resource controller ERC and/or (b) other local parameters relevant for the operation of the energy resource ER.

The energy management policies EMP are generated by the control unit CU or loaded from a database and after their distribution can be used in case that a communication loss or limitation is detected. After a loss of communication or in case a limitation has been detected, the local policy management unit PMU of the affected energy resource controller ERC having lost the communication to the control unit selects and loads the stored said energy management policy EMP from the local memory M and executes the loaded energy management policy EMP.

In a possible embodiment, the energy management policies EMP are calculated by at least one processor of the control unit CU depending on different data comprising a probability of loss or limitation of the monitored communication links CL between the control unit CU and the distributed energy resource controllers ERC of said energy management system and/or depending on predicted local energy, power and/or thermal states of the energy resources ER controlled by the distributed energy resource controllers ERC after a loss or limitation of communication of at least one monitored communication link CL has occurred.

The predicted local energy, power and/or thermal states of the energy resources ER controlled by the distributed energy resource controllers ERC can be predicted on the basis of available global information including time information and power supply grid frequency. Further, the predicted local energy states of the energy resources ER controlled by the distributed energy resource controllers ERC can be predicted on the basis of available local information including for instance weather information. Further, the predicted local energy states of the energy resources ER controlled by the distributed energy resource controllers ERC can be predicted in a possible implementation on the basis of historic behavior data about operation behavior of the respective energy resources ER in the past before the loss or limitation of communication of at least one monitored communication link CL has been detected. The predicted operation behavior of an energy resource ER can be calculated in a possible implementation in real time after a loss or limitation of the communication link has been detected.

After a loss or limitation of communication of the communication link CL to a control unit CU has occurred and been detected, the policy management unit PMU of an energy resource controller of an affected energy resource ER emulates a continued reception of control parameters CP from the control unit CU on the basis of the active set of energy management policies EMP received from the control unit CU. The energy resource controller ERC further performs a continued local control of the associated energy resource ER using the control parameters CP and control limits CL indicated by or derived from a valid energy management policy EMP activated from the stored set of energy management policies. The use of the valid energy management policy EMP used by the policy management unit PMU in response to the communication loss or communication limitation indicates a reaction of the policy management unit PMU and its energy resource controller ERC in response to measurements m of local parameters. These local parameters can comprise at least one measured value or time series of one of the following (a) power supply grid variables comprising a voltage frequency of a voltage supplied by the power supply grid PSG, a voltage level of a voltage at the location of the energy resource ER, spectrum data of supplied voltages, electrical current data at the connection to the power supply grid, phase shift data between voltage and current at the connection to the power supply grid and/or (b) other variables, such as the power output of a local power generator, the power consumption of a local power consumer, the state of charge or state of supply of the energy resource, the temperature of the energy resource or its environment.

The measurements m can be performed in a possible implementation by means of sensors located at the energy resource ER. It is also possible that the measurements m are performed by sensors at other energy resources ER of the same type located in the vicinity of the affected energy resource ER, e.g. at a neighbouring node of the power supply grid PSG. The measurements m are performed during operation of the energy management system and in particular when a loss or limitation of communication of the communication link CL between the energy resource controller ERC of the affected energy resource ER and the control unit CU has occurred. Accordingly, the measurements m can be performed permanently, i.e. periodically during operation or event-driven, when a loss or limitation of communication is detected.

The measurements m can comprise a different type of data including context data comprising weather condition data indicating a current or forecast weather condition at the location of the energy resource ER as well as time data indicating a local time, date, day of week, or month at the location of the energy resource ER as well as location data indicating a current geographical location of the energy resource ER.

The measurements m can also comprise reliability data indicating a reliability of the communication link CL between the energy resource controller ERC and the control unit CU and/or a reliability of the associated energy resource ER controlled by the respective energy resource controller ERC.

The communication link CL as illustrated in FIG. 3 can in a possible embodiment comprise a wired link via a communication network, in particular a public communication network. It is also possible that the communication link CL comprises a wireless link via a wireless communication network. In a still further possible embodiment, the communication link CL can also be a communication link via the power supply grid PSG (power line communication PLC). With the energy management system, it is further possible that some energy resource controllers ERC are connected to the control unit CU via a first type of communication link while other energy resource controllers are connected to the control unit CU via a different type of communication links. The control unit CU detects a loss or limitation of communication of a monitored communication link CL to the energy resource controller ERC of an energy resource ER in a possible implementation by monitoring keep alive signals or keep alive messages transmitted by the energy resource controller ERC to the control unit CU via the respective communication link CL monitored by the control unit CU. Alternatively, the control unit CU can detect a loss or limitation of communication of a monitored communication link CL to the energy resource controller ERC of an energy resource ER in a possible implementation by examining responses from an energy resource controller ERC to keep alive messages of keep alive signals or keep alive messages transmitted by the control unit CU to the energy resource controller ERC.

With the energy management system as illustrated in FIG. 1 having a central control unit CU, the central control unit CU is adapted to transmit energy management policies with validity limits, for example separate energy management policies for the long- and short-term, for instance via a public communication network CNW to the energy resource controllers ERC to enable a coordinated dispatching of the energy resources ER by the energy resource controllers ERC, even if the communication network CNW breaks down or exhibits excessive latencies. The energy resource controllers ERC are adapted to transmit keep alive signals or messages via the communication network to the central control unit CU to enable the control unit CU to monitor a policy activation status of the individual energy resource controllers ERC and to thereby predict the dispatching of the individual energy resources ER even if the communication network CNW breaks down. The energy resource controllers ERC can transmit local measurements m and status information via the communication network CNW to the central control unit CU to enable the control unit CU to plan a dispatching of the energy resources ER and to generate energy management policies EMP with validity limits, for example separate energy management policies for the long and short term, based on the received information data.

In a possible embodiment, the set of energy management policies EMP can comprise a first energy management policy EMP1 having rules R used by the policy management unit PMU of the energy resource controller ER during a predetermined time period directly after a loss or limitation of communication has occurred and detected as well as a second energy management policy EMP2 having rules R which are used by the policy management unit PMU of the energy resource controller ERC after the predetermined time period has expired. In a possible embodiment, the control unit CU can transmit long- and short-term energy management policies EMP via the communication network CNW to the switchable energy resource controllers. Optionally, an energy management policy EMP with the shortest term can also be a one-time energy management policy which corresponds to a direct setting of control parameters and/or control limits on the energy resource ER by the control unit CU. This can be preferable in case of a low-latency public communication network.

The use of long- and short-term energy management policies EMP is in particular important in case of a partial breakdown of the communication network CNW. In this case, the control unit CU does calculate a policy activation status of the unreachable energy resources ER whose communication link CL has been lost or limited based on the energy management policies activated by the policy management unit PMU, the status information from the still reachable energy resource controllers ERC as well as context data including weather conditions and historical status data (timelines). The short- and long-term energy management policies EMP distributed to the reachable energy resource controllers ERC are set such that they cover a delta between the predicted policy activation status of the unreachable energy resource controllers ERC and the requirements towards the entirety of the energy resource controllers ERC. These requirements can include a shaving of a peak load, a peak generation, the provisioning of a control reserve, or power quality corrections.

In the embodiment as illustrated in FIG. 2, there can be provided multiple control units CU wherein each of which can be directly connected to an energy resource controller ERC. It is also possible that some energy resource controllers ERC do not have a control unit CU as also shown in FIG. 2. The distributed control units CU and all energy resource controllers ERC are connected to the communication network CNW. Optionally, the energy resource controllers ERC which are directly connected to the control units CU can omit a connection to the communication network CNW. In a possible embodiment, the control units CU negotiate the long- and short-term policies EMP to be transmitted to the energy resource controllers ERC. This negotiation can take place by a peer to peer mechanism, for instance by selection of a master control unit by means of voting. The long- and short-term energy management policies EMP are then communicated via the communication network to the control units CU. The distributed control units CU maintain a common database with local measurements m of the energy resource controllers ERC and the status of the energy resource controllers ERC to enable the control units CU to plan the dispatching of the energy resources ER and to generate long- and short-term energy management policies EMP based on this plan. The common database can be maintained via a peer to peer mechanism or by a replication mechanism. The energy resource controllers ERC can transmit keep alive messages or signals via the communication network CNW to one or more control units CU to enable each control unit CU to monitor the policy activation status of the individual energy resource controllers ERC and thereby predict a dispatching of the individual energy resources ER, even if the communication network CNW breaks down. The control units CU can transmit keep alive signals or messages via the communication network to each other to enable each control unit CU to monitor the activity status of the other control units CU and to change roles, if necessary. For example, if the keep alive messages or signals from a master control unit are missing for a predefined period, the other control units CU which still exchange keep alive signals or messages can elect a new master control unit. In case of a split of the communication network CNW into two domains, each control unit CU controls the energy resource controllers ERC which are still reachable by the respective control unit CU. Responsibility for the grid service would be assigned to the control units by the respective control unit itself according to a pre-negotiated or pre-set split, which may depend on the number of energy resources controllers which are still reachable by the respective control unit. If multiple control units can reach the energy resource controllers ERC in question, they can negotiate the long- and short-term energy management policies EMP to be transmitted to the energy resource controllers ERC by a peer to peer mechanism, e.g. by selection of a master control unit via voting.

Optionally, the energy management policy EMP with the shortest term can also be a one-time policy which corresponds to a direct setting of control parameters CP and/or control limits CL on the energy resource by one control unit CU. This would be particularly preferable in case of a low latency public communication network.

Figure 4:
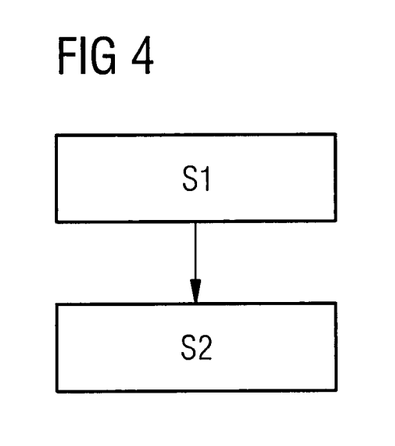
FIG. 4 shows a flow chart of a possible embodiment of a method for performing an energy management in a power supply grid according to a further aspect of the present invention.

Optionally, the control units CU can transmit long- and short-term energy management policies via the communication network only to the energy resource controllers ERC which are reachable. This is important in the case of a partial breakdown of the communication network. In this case, the control units CU do calculate the policy activation status of the unreachable energy resource controllers based on the status information from the reachable energy resource controllers ERC, the weather condition data as well as historical status data. The short- and long-term energy management policies distributed to the still reachable energy resource controllers can be set to cover a delta between the predicted policy activation status of the unreachable energy resource controllers and the requirements towards the entirety of the energy resource controllers. These requirements can again include the shaving of a peak load, a peak generation, the provisioning of a control reserve as well as power quality corrections. FIG. 4 shows a simple flow chart of a possible implementation of a method for performing an energy management in a power supply grid PSG according to a further aspect of the present invention. In a first step S1, the communication links CL between at least one communication unit CU and the energy resource controllers ERC via the communication network CNW are monitored. If a loss or limitation of communication of the communication link CL between the energy resource controller ERC of the affected energy resource ER and the communication unit CU is detected, the predicted operation behavior of the energy resource ER is calculated in step S2 by the control unit CU.

The communication unit CU then controls the energy resource controllers ERC of other remaining energy resources ER to each of which a communication link CL via said communication network CNW still exists depending on the calculated predicted operation behavior of the affected energy resource ER whose energy resource controller ERC has at least partially lost its communication link CL to the communication unit CU.

With the method according to the second aspect of the present invention, an explicit signalling of energy management policies EMP between the control unit CU and the energy resource controllers ERC is performed. In a simple case, the energy management policy EMP can be to continue the operation in the last set point for a certain period of time after a communication loss or limitation has been detected. In alternative embodiments, the energy management policy EMP can contain information how the respective affected energy resource ER shall react on local measurements m such as (a) power supply grid variables comprising a voltage frequency of a voltage supplied by the power supply grid PSG, a voltage level of a voltage at the location of the energy resource ER, spectrum data of supplied voltages, electrical current data at the connection to the power supply grid, phase shift data between voltage and current at the connection to the power supply grid and/or (b) other variables, such as the power output of a local power generator, the power consumption of a local power consumer, the state of charge or state of supply of the energy resource, the temperature of the energy resource or its environment.

The control unit CU monitors the communication link CL and in case of a loss or a limitation of communication can start to estimate how the particular energy resource ER reacts on local measurements m. Even though the estimation might not be absolutely accurate, it allows using the affected energy resource ER although a loss or a limitation of communication occurs. In the case of strict requirements on the grid service, the control unit CU estimates values for those local measurements m which cannot be reliably estimated from other sources which reflect the worst case for the grid service availability of the affected energy resource, and assumes a reduced or diminished availability of the energy resource for grid services as soon as the thusly predicted state of the energy resource reaches a critical area and controls the remaining energy resources to compensate for the reduced or diminished availability of the affected energy resource. The energy management policies transmitted to the energy resource controllers ERC also cause an estimation of such worst-case values, and cause the deployment of the energy resource for grid service to reflect a reduced or diminished availability of the energy resource for grid service even if the actual availability of the energy resource as determined by the actual local measurements m is still outside the critical area. The method and apparatus according to the present invention is well-suited for power supply systems although due to real time constraints a control cannot be absolutely accurate and this inaccuracy is compensated by spare energy resources and balanced afterwards. However, the closer the forecast and the predicted behavior is to the real operation behavior of an affected energy resource ER and the more energy resources ER can be used even though a communication link CL is broken or limited, the more efficient these deployed energy resources ER can be used in the energy management system.

In a possible embodiment, the control unit CU uses measurements m of energy resources ER nearby and/or of the same type as the energy resource whose communication link CL has been lost or limited to estimate the local measurements m of the energy resource ER with a loss of communication to estimate based hereon a local setting of operation of the energy resource ER depending on the communicated energy management policy EMP.

In a possible embodiment, the measurements m can include current or forecast data. The measurements m can include measurements over time to optimize the energy management. The measurements m can also provide reliability information data about the communication link CL or even reliability data of the respective energy resource ER. In a still further possible implementation, the control unit CU can also consider known or measured reliability statistics of a particular energy resource ER for policy setting, e.g. the usage limits of the energy management policy EMP can be broader in case of a reliable energy resource.

In a still further possible embodiment, the control unit CU can transmit several energy management policies EMP to a particular energy resource controller ERC of an energy resource ER to address different cases of loss of control, e.g. an energy management policy EMP for loss of communication or control with a short duration and another energy management policy EMP for loss of control or communication with a long duration. For instance, in the case of a short duration, the energy management policy EMP can be to continue operation in the same set point, whereas in case of a long duration of the communication loss, also the estimation of the grid status over daytime is considered to modify a set point accordingly.

In addition, in a possible embodiment, regular and/or specific local usage patterns can be considered for a policy setting, e.g. at a particular point in daytime, loads connected to the power supply grid PSG can be switched on which reduces the remaining usage of the energy resource ER. In this case, the predicted daily load can be taken into account and a reduced usage of the energy resource ER is set for this daytime even in case that the communication is lost at that point of time. In addition, the control unit CU can estimate the operation behavior of an energy resource ER even in the case of communication loss and can compensate this effect by directly controlling and/or providing suitable energy management policies EMP for other not affected energy resources ER.

In a possible implementation, the energy management policy EMP sent by the control unit CU can consist of the following control parameters CP and control limits comprising maximum and minimum charging currents for local usage, a current to be employed in grid balancing as a target value or a target function of voltage and frequency, the limits for the state of charge of the storage unit for local usage or equivalently the limits for local energy usage, the expiry times during which the above control parameters are valid individually as well as the times after which certain parts of operation are to be discontinued. Optionally, the control parameters CP can comprise alternative sets of control parameters CP and control limits with later expiry times. At all times where a communication is lost to a given energy resource ER and a given control limit or control parameter CP is no longer valid but a not yet discontinued part of operation of the energy resource ER depends on it, the control unit CU can calculate a most likely value for the given control limit or control parameter CP which is currently effective on the energy resource ER. Depending on the requirements of the grid service, the control unit CU can also calculate a worst-case value. Energy management policies EMP of the energy resources ER which can still be reached by the communication unit CU are then set to reflect the most likely values or worst-case values of all the energy resources ER which can no longer be reached by the communication links CL and such that all the energy resources ER in total still serve all the required applications such as local buffering of a renewable energy resource and to provide grid services.

If a communication link CL is broken or limited, the control unit CU makes an assumption about the local situation of the distributed energy resource ER, e.g. at the battery storage. If the estimation has a certain likelihood to be accurate or close to accurate, the energy management system according to the present invention acts accordingly to this likelihood and controls the other energy resources ER without having detailed information of the particular affected energy resource. This has as a consequence a better balanced use of energy resources ER when compared to shutting them simply down in case of loss of communication. The communication link CL does not only provide means of information transfer but also the electrical system measured at several points does provide information transfer if these measurements are used for estimation. The same is true for measurements over time or of weather conditions which due to renewable energy resources ER do influence the electrical power system. The invention provides a reliable and effective energy management system, even for a system using an unreliable communication network.

In the following, a simple example is given for illustrating the operation of the method and apparatus according to the present invention.

EXAMPLE

Three batteries B1-B3 in residential homes provide primary control power with a positive reserve of 30 kW (discharging the battery) and a negative reserve of 30 kW (charging the battery, 30 kW=100% in the following). The actual emitted (positive) or absorbed (negative) control power depends linearly on the deviation of the grid frequency from 50 Hz and is capped at 49.8 Hz and 50.2 Hz. The grid frequency is measured at each house. Each battery B can absorb and emit a maximum of 15 kW of power and store a maximum of 10 kWh of energy (10 kWh=100%). At a time t_0, the following is the pertinent state of the system:

|  | B1 | B2 | B3 |
|---|---|---|---|
| SoC | 10% | 80% | 80% |
| Battery power output | 0% | 0% | 0% |
| Battery power input | 0% | 0% | 0% |
| Negative reserved control power (charge) | 50% | 25% | 25% |
| Positive reserved control power (discharge) | 0% | 50% | 50% |
| Grid frequency | 50.0 | 50.0 | 50.0 |

At this point, the connection between the control unit CU and the ERC of B1 is lost. In a conventional system, battery B1 immediately ceases operation and the control unit CU redistributes the contribution of B1 to B2 and B3. The pertinent status of the system thus changes to the following:

|  | B1 | B2 | B3 |
|---|---|---|---|
| SoC | 10% | 80% | 80% |
| Battery power output | 0% | 0% | 0% |
| Battery power input | 0% | 0% | 0% |
| Negative reserved control power (charge) | 0% | 50% | 50% |
| Positive reserved control power (discharge) | 0% | 50% | 50% |
| Grid frequency | 50.0 | 50.0 | 50.0 |

If now an oversupply in the power supply grid PSG occurs the status changes to:

|  | B1 | B2 | B3 |
|---|---|---|---|
| SoC | 10% | 80% | 80% |
| Battery power output | 0% | 0% | 0% |
| Battery power input | 0% | 50% | 50% |
| Negative reserved control power (charge) | 0% | 50% | 50% |
| Positive reserved control power (discharge) | 0% | 50% | 50% |
| Grid frequency | 50.2 | 50.2 | 50.2 |

After several, e.g., 8 minutes of operation under these conditions, the state of the system is:

|  | B1 | B2 | B3 |
|---|---|---|---|
| SoC | 10% | 100% | 100% |
| Battery power output | 0% | 0% | 0% |
| Battery power input | 0% | 0% | 0% |
| Negative reserved control power (charge) | 0% | 50% | 50% |
| Positive reserved control power (discharge) | 0% | 50% | 50% |
| Grid frequency | 50.2 | 50.2 | 50.2 |

This signals system failure: Neither B2 nor B3 are capable to work against the grid instability anymore (note that the current setup of the European grid requires the capability of primary control reserves to perform against a 50.2 Hz frequency for 15 minutes).

In contrast, with the method according to the present invention, if the connection to B1 is lost, the pertinent state is unchanged if the energy management policy EMP assigned to B1 is simply to continue in the same operational mode until 50% charge is reached or until one hour has passed, whichever comes earlier:

|  | B1 | B2 | B3 |
|---|---|---|---|
| SoC | 10% | 80% | 80% |
| Battery power output | 0% | 0% | 0% |
| Battery power input | 0% | 0% | 0% |
| Negative reserved control power (charge) | 50% | 25% | 25% |
| Positive reserved control power (discharge) | 0% | 50% | 50% |
| Grid frequency | 50.0 | 50.0 | 50.0 |

If now the same oversupply in the power supply grid PSG as above occurs:

|  | B1 | B2 | B3 |
|---|---|---|---|
| SoC | 10% | 80% | 80% |
| Battery power output | 0% | 0% | 0% |
| Battery power input | 50% | 25% | 25% |
| Negative reserved control power (charge) | 50% | 25% | 25% |
| Positive reserved control power (discharge) | 0% | 50% | 50% |
| Grid frequency | 50.2 | 50.2 | 50.2 |

After several, e.g., 8 minutes of operation, the state is as follows:

|  | B1 | B2 | B3 |
|---|---|---|---|
| SoC | 30% | 90% | 90% |
| Battery power output | −50% | −25% | −25% |
| Negative reserved control power (charge) | 50% | 25% | 25% |
| Positive reserved control power (discharge) | 0% | 50% | 50% |
| Grid frequency | 50.2 | 50.2 | 50.2 |

The system is still fully operational. This is known to the control unit CU, as B1's state of charge can be calculated to be 30% from the frequency measurements of B2 or B3 and the policy for B1. Therefore, there is no need to reconfigure the system. As a further advantage battery B1 is much closer to 50% charge than after 8 minutes of operation before implementing the method according to the present invention.

After 15 minutes of operation, the state is as follows:

|  | B1 | B2 | B3 |
|---|---|---|---|
| SoC | 48% | 99% | 99% |
| Battery power output | 0% | 0% | 0% |
| Battery power input | 50% | 25% | 25% |
| Negative reserved control power (charge) | 50% | 25% | 25% |
| Positive reserved control power (discharge) | 0% | 50% | 50% |
| Grid frequency | 50.2 | 50.2 | 50.2 |

The system is still fully operational after 15 minutes. Note that this is the current requirement for primary control power. The state of the system including the state of battery B1 is known to the controller since it can be calculated from the frequency measurement of battery B2 or battery B3 and the energy management policy EMP for battery B1.

The invention claimed is:

1. An energy management system of a power supply grid (PSG), comprising:
   at least one control unit (CU) connected to distributed energy resource controllers (ERC) of energy resources (ER) of the power supply grid (PSG) by means of a communication network (CNW), wherein the control unit (CU) monitors communication links (CL) between the control unit (CU) and the energy resource controllers (ERC) via the communication network (CNW);
   wherein the control unit (CU) is adapted to calculate a predicted operation behavior of an energy resource controlled by an energy resource controller (ERC) when a loss of communication or a communication bandwidth limitation of the monitored communication link (CL) to the energy resource controller (ERC) is detected;
   wherein the control unit (CU) is adapted to control energy resource controllers (ERC) of other energy resources (ER) of said power supply grid (PSG) to which a communication link (CL) via said communication network (CNW) still exists based on the calculated predicted behavior of the affected energy resource (ER) whose energy resource controller (ERC) has lost its communication link (CL) to said control unit (CU) or where the communication bandwidth of the communication link (CL) is limited;
   wherein said control unit (CU) is further adapted to calculate energy management policies and to distribute them to the energy resource controllers (ERC) of said energy management system such that after the loss or the limitation of communication between said control unit (CU) and at least one affected energy resource controller (ERC) has been detected, the distributed energy management policies executed by the energy resource controllers (ERC) provide collectively sufficient power for power supply grid services, wherein the control unit (CU) calculates and distributes the energy management policies for at least one energy resource controller (ERC) more than once during operation of the energy management system;
   wherein the energy resource controller (ERC) to which the loss or limitation of communication of said communication link (CL) is detected is adapted to perform a local control of the associated energy resource (ER), and wherein the energy resource of the energy resource controller to which the loss or limitation of communication of said communication link (CL) is detected makes a contribution to the operation of the power supply grid;
   wherein the energy management policies calculated by at least one processor of said control unit (CU) are calculated depending on predicted local energy states of the energy resources (ER) controlled by the distributed energy resource controllers (ERC) after the loss or limitation of communication of at least one monitored communication link (CL) has occurred;
   wherein the predicted local energy states of the energy resources (ER) controlled by the distributed energy resource controllers (ERC) are predicted on the basis of available global information including a power supply grid frequency, available local information including weather information and available historic behavior data about a past operation behavior of the respective energy resources (ER) before the loss or limitation of communication of the at least one monitored communication link (CL) has been detected;
   wherein the predicted operation behavior of the respective energy sources (ER) is calculated in a possible implementation in real time after the loss or limitation of the communication link has been detected;
   wherein said set of energy management policies comprises at least one energy management policy having rules used by a policy management unit (PMU) connected to the energy resource controller (ERC) to perform the local control of the associated energy resource (ER).

2. The energy management system according to claim 1, wherein after a loss or a limitation of communication between said control unit (CU) and at least one affected energy resource controller (ERC) has been detected, a local optimization of individual energy resources (ER) controlled by the energy resource controllers (ERC) is performed on the basis of the energy management policies calculated and distributed by the control unit (CU) of said energy management system to said energy resource controllers (ERC) before the loss or limitation of communication has occurred.

3. The energy management system according to claim 2, wherein after a loss or limitation of communication between said control unit (CU) and at least one affected energy resource controller (ERC) has been detected, a global optimization of the total energy resources (ER) controlled by the energy resource controllers (ERC) is performed on the basis of the energy management policies calculated and distributed by the control unit (CU) of said energy management system to said energy resource controllers (ERC) before the loss or limitation of communication has occurred.

4. The energy management system according to claim 1, wherein the energy management policies calculated by at least one processor of said control unit (CU) are calculated also depending on a probability of loss or limitation of the monitored communication links (CL) between said control unit (CU) and the distributed energy resource controllers (ERC) of said energy management system.

5. The energy management system according to claim 4, wherein the predicted local energy states of the energy resources (ER) controlled by the distributed energy resource controllers (ERC) are predicted also on the basis of available global information including time information data and/or on the basis of available local information including weather information and/or on the basis of historic behavior data about the operation behavior of the energy resources (ER) in the past before the loss or limitation of communication of at least one monitored communication link (CL) has been detected.

6. The energy management system according to claim 1, wherein said control unit (CU) is a central control center or is formed by distributed control entities adapted to calculate the predicted operation behavior of the affected energy resource (ER) on the basis of the active set of energy management policies transmitted by said control unit (CU) via the communication link (CL) to the energy resource controller (ERC) of the affected energy resource (ER) before a loss or limitation of communication of said communication link (CL) is detected.

7. The energy management system according to claim 1, wherein the control unit (CU) and the policy management unit (PMU) of an energy resource controller (ERC) calculate predicted operation behavior of the energy resource (ER) after a loss or limitation of communication has been detected based on measurements (M) known simultaneously to both the
control unit (CU) and the policy management unit (PMU) and based on values communicated from the control unit (CU) to the policy management unit (PMU) before the loss or limitation of communication has occurred and where the policy management unit (PMU) controls the operation behavior.

8. The energy management system according to claim 1, wherein after a loss or a limitation of communication of the communication link (CL) to said control unit (CU) has occurred said policy management unit (PMU) of the energy resource controller (ERC) is adapted to emulate a continued reception of control parameters from said control unit (CU) on the basis of the active set of energy management policies and to perform a continued local control of the associated energy resource (ER) controlled by said energy resource controller (ERC) using the control parameters within control limits indicated by the set of energy management policies.

9. The energy management system according to claim 8, wherein the rules of said energy management policies used by the policy management unit (PMU) of the energy resource controller (ERC) indicate a reaction of the policy management unit (PMU) in response to measurements (M) of local parameters of said power supply grid (PSG) distributing power to the energy resource (ER) or receiving power from the energy resource (ER) being controlled by said energy resource controller (ERC).

10. The energy management system according to claim 9, wherein said local parameters comprise at least one measured value or time series of at least one of the following variables: voltage frequency, voltage, spectra of the voltage, current, phase shift between voltage and current, state of charge or state of supply of the energy management unit, temperature of the energy resource (ER) or the environment of the energy resource (ER).

11. The energy management system according to claim 9, wherein said measurements (M) are performed by means of sensors located at the energy resource (ER) and/or at other energy resources (ER) of the same type located in the vicinity of the affected energy resource (ER) when a loss or limitation of communication of the communication link (CL) between the energy controller of the affected energy resource (ER) and the control unit (CU) has occurred.

12. The energy management system according to claim 9, wherein said measurements (M) comprise context data including weather condition data indicating a current and/or forecast weather condition at the location of the energy resource (ER), time data indicating a local time, date, day of week, and/or month at the location of the energy resource (ER), and location data indicating a current geographical location of the energy resource (ER).

13. The energy management system according to claim 1, wherein said energy resource (ER) is immobile and located at a fixed location and connected permanently to the power supply grid (PSG) or mobile and moveable between different locations and connectable to the power supply grid (PSG).

14. The energy management system according to claim 1, wherein said energy resource (ER) is adapted to feed electrical power into said power supply grid (PSG) and/or to draw electrical power from said power supply grid (PSG) and/or to store electrical power (PSG).

15. The energy management system according to claim 9, wherein said measurements (M) comprise reliability data indicating a reliability of the communication link (CL) between the energy resource controller (ERC) and the control unit (CU) and/or a reliability of the associated energy resource (ER).

16. The energy management system according to claim 6, wherein said set of energy management policies comprises a first energy management policy having rules used by the policy management unit (PMU) of the energy resource controller (ERC) during a predetermined time period directly after a loss or limitation of communication has occurred and a second energy management policy having rules used by the policy management unit (PMU) of the energy resource controller (ERC) after the predetermined time period has expired.

17. The energy management system according to claim 1, wherein said communication link (CL) comprises a wired or wireless link via a communication network (CNW) and/or a communication link (CL) via said power supply grid (PSG).

18. The energy management system according to claim 1, wherein said control unit (CU) is adapted to detect a loss or limitation of communication of a monitored communication link (CL) to an energy resource controller (ERC) of an energy resource (ER) by monitoring keep alive signals or keep alive messages transmitted by the energy resource controller (ERC) to the control unit (CU) via said communication link (CL) or by examining the responses to keep alive signals or keep alive messages transmitted by the control unit (CU) to the energy resource controller (ERC) via said communication link (CL).

19. A method for performing an energy management in a power supply grid comprising distributed energy resources (ER) having energy resource controllers (ERC) connected to at least one control unit (CU) by means of a communication network (CNW), comprising the steps of:
(a) monitoring the communication links (CL) between said at least one control unit (CU) and the energy resource controllers (ERC) via said communication network (CNW);
(b) calculating a predicted operation behavior of an energy resource (ER) if a loss or limitation of communication of the communication link (CL) between the energy resource controller (ERC) of the affected energy resource (ER) and the control unit (CU) is detected;
(c) controlling, using the control unit (CU), energy resource controllers (ERC) of other energy resources (ER) of a power supply grid (PSG) to which a communication link (CL) via said communication network (CNW) still exists based on the calculated predicted behavior of the affected energy resource (ER) whose energy resource controller (ERC) has at least partially lost its communication link (CL) to said control unit (CU) or where the communication bandwidth of the communication link (CL) is limited;

(d) calculating, using the control unit (CU), energy management policies and distributing them to the energy resource controllers (ERC) of said energy management system such that after the loss or the limitation of communication between said control unit (CU) and at least one affected energy resource controller (ERC) has been detected, the distributed energy management policies executed by the energy resource controllers (ERC) provide collectively sufficient power for power supply grid services, wherein the control unit (CU) calculates and distributes the energy management policies for at least one energy resource controller (ERC) more than once during operation of the energy management system; and wherein the energy resource controller (ERC) to which the loss or limitation of communication of said communication link (CL) is detected is adapted to perform a local control of the associated energy resource (ER), and wherein the energy resource of the energy resource controller to which the loss or limitation of communication of said communication link (CL) is detected makes a contribution to the operation of the power supply grid;

wherein the energy management policies calculated by at least one processor of said control unit (CU) are calculated depending on predicted local energy states of the energy resources (ER) controlled by the distributed energy resource controllers (ERC) after the loss or limitation of communication of at least one monitored communication link (CL) has occurred; and wherein the predicted local energy states of the energy resources (ER) controlled by the distributed energy resource controllers (ERC) are predicted on the basis of available global information including a power supply grid frequency, available local information including weather information and available historic behavior data about a past operation behavior of the respective energy resources (ER) before the loss or limitation of communication of the at least one monitored communication link (CL) has been detected;

wherein the predicted operation behavior of the respective energy sources (ER) is calculated in a possible implementation in real time after the loss or limitation of the communication link has been detected;

wherein said set of energy management policies comprises at least one energy management policy having rules used by a policy management unit (PMU) connected to the energy resource controller (ERC) to perform the local control of the associated energy resource (ER).

20. The method of claim 16, wherein after a loss or a limitation of communication of the communication link (CL) to said control unit (CU) has occurred said policy management unit (PMU) of the energy resource controller (ERC) is adapted to emulate a continued reception of control parameters from said control unit (CU) on the basis of the active set of energy management policies and to perform a continued local control of the associated energy resource (ER) controlled by said energy resource controller (ERC) using the control parameters within control limits indicated by the set of energy management policies.

21. An energy management system of a power supply grid (PSG), comprising:

at least one control unit (CU) connected to distributed energy resource controllers (ERC) of energy resources (ER) of the power supply grid (PSG) by means of a communication network (CNW), wherein the control unit (CU) monitors communication links (CL) between the control unit (CU) and the energy resource controllers (ERC) via the communication network (CNW);

wherein the control unit (CU) is adapted to calculate a predicted operation behavior of an energy resource controlled by an energy resource controller (ERC) when a loss of communication or a communication bandwidth limitation of the monitored communication link (CL) to the energy resource controller (ERC) is detected;

wherein the control unit (CU) is adapted to control energy resource controllers (ERC) of other energy resources (ER) of said power supply grid (PSG) to which a communication link (CL) via said communication network (CNW) still exists based on the calculated predicted behavior of the affected energy resource (ER) whose energy resource controller (ERC) has lost its communication link (CL) to said control unit (CU) or where the communication bandwidth of the communication link (CL) is limited;

wherein said control unit (CU) is further adapted to calculate energy management policies and to distribute them to the energy resource controllers (ERC) of said energy management system such that after the loss or the limitation of communication between said control unit (CU) and at least one affected energy resource controller (ERC) has been detected, the distributed energy management policies executed by the energy resource controllers (ERC) provide collectively sufficient power for power supply grid services, wherein the control unit (CU) calculates and distributes the energy management policies for at least one energy resource controller (ERC) more than once during operation of the energy management system;

wherein the energy resource controller (ERC) to which the loss or limitation of communication of said communication link (CL) is detected is adapted to perform a local control of the associated energy resource (ER), and wherein the energy resource of the energy resource controller to which the loss or limitation of communication of said communication link (CL) is detected makes a contribution to the operation of the power supply grid;

wherein the energy management policies calculated by at least one processor of said control unit (CU) are calculated depending on predicted local energy states of the energy resources (ER) controlled by the distributed energy resource controllers (ERC) after the loss or limitation of communication of at least one monitored communication link (CL) has occurred;

wherein the predicted local energy states of the energy resources (ER) controlled by the distributed energy resource controllers (ERC) are predicted on the basis of available global information including a power supply grid frequency; and wherein said set of energy management policies comprises a first energy management policy having rules used by the policy management unit (PMU) of the energy resource controller (ERC) during a predetermined time period directly after a loss or limitation of communication has occurred and a second energy management policy having rules used by the policy management unit (PMU) of the energy resource controller (ERC) after the predetermined time period has expired.

22. An energy management system of a power supply grid (PSG), comprising:
- at least one control unit (CU) connected to distributed energy resource controllers (ERC) of energy resources (ER) of the power supply grid (PSG) by means of a communication network (CNW), wherein the control unit (CU) monitors communication links (CL) between the control unit (CU) and the energy resource controllers (ERC) via the communication network (CNW);
- wherein the control unit (CU) is adapted to calculate a predicted operation behavior of an energy resource controlled by an energy resource controller (ERC) when a loss of communication or a communication bandwidth limitation of the monitored communication link (CL) to the energy resource controller (ERC) is detected;
- wherein the control unit (CU) is adapted to control energy resource controllers (ERC) of other energy resources (ER) of said power supply grid (PSG) to which a communication link (CL) via said communication network (CNW) still exists based on the calculated predicted behavior of the affected energy resource (ER) whose energy resource controller (ERC) has lost its communication link (CL) to said control unit (CU) or where the communication bandwidth of the communication link (CL) is limited;
- wherein said control unit (CU) is further adapted to calculate energy management policies and to distribute them to the energy resource controllers (ERC) of said energy management system such that after the loss or the limitation of communication between said control unit (CU) and at least one affected energy resource controller (ERC) has been detected, the distributed energy management policies executed by the energy resource controllers (ERC) provide collectively sufficient power for power supply grid services, wherein the control unit (CU) calculates and distributes the energy management policies for at least one energy resource controller (ERC) more than once during operation of the energy management system;
- wherein the energy resource controller (ERC) to which the loss or limitation of communication of said communication link (CL) is detected is adapted to perform a local control of the associated energy resource (ER), and wherein the energy resource of the energy resource controller to which the loss or limitation of communication of said communication link (CL) is detected makes a contribution to the operation of the power supply grid;
- wherein the energy management policies calculated by at least one processor of said control unit (CU) are calculated depending on predicted local energy states of the energy resources (ER) controlled by the distributed energy resource controllers (ERC) after the loss or limitation of communication of at least one monitored communication link (CL) has occurred;
- wherein the predicted local energy states of the energy resources (ER) controlled by the distributed energy resource controllers (ERC) are predicted on the basis of available global information including a power supply grid frequency; and
- wherein after a loss or a limitation of communication of the communication link (CL) to said control unit (CU) has occurred said policy management unit (PMU) of the energy resource controller (ERC) is adapted to emulate a continued reception of control parameters from said control unit (CU) on the basis of the active set of energy management policies and to perform a continued local control of the associated energy resource (ER) controlled by said energy resource controller (ERC) using the control parameters within control limits indicated by the set of energy management policies.

* * * * *